Nov. 6, 1928.  
H. D. LATHROP  
1,690,735  
MILK DUMPING DEVICE  
Filed Oct. 13, 1924   2 Sheets-Sheet 1
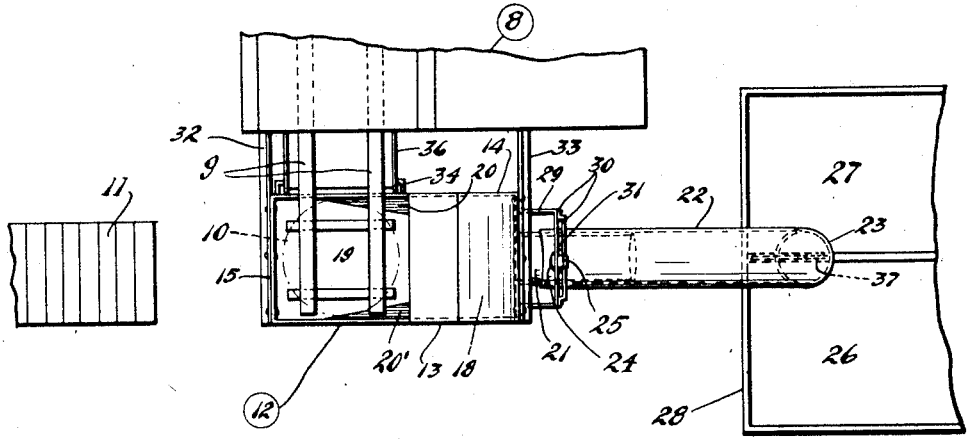
Fig. 1
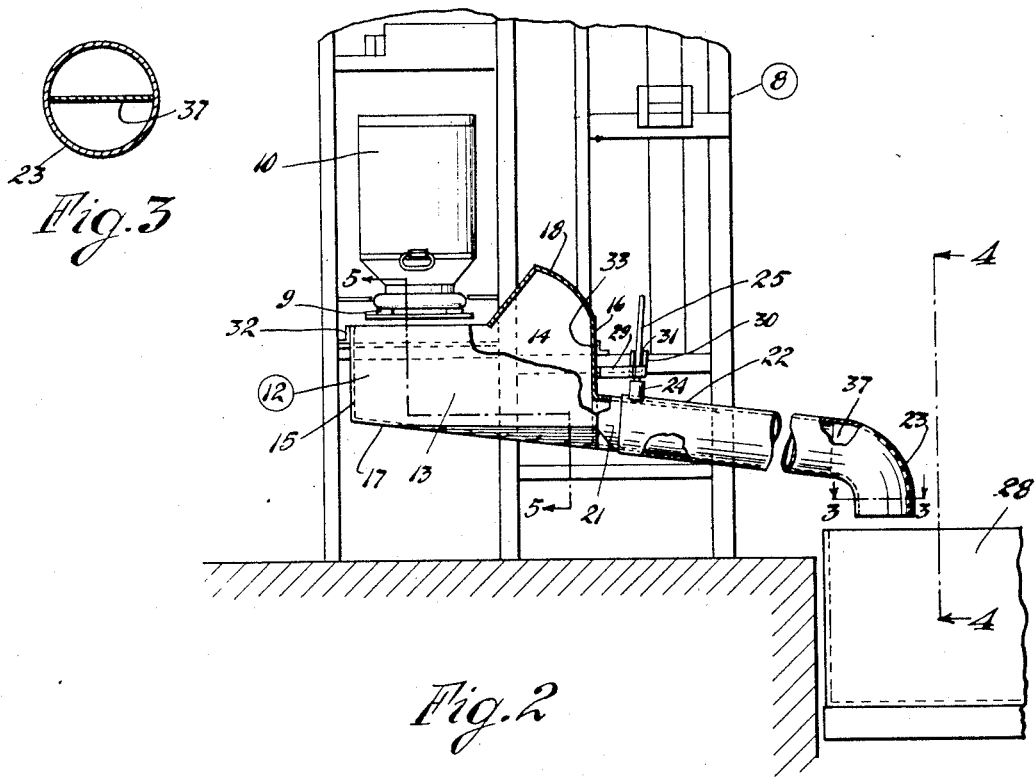
Fig. 3
Fig. 2
Witnesses:
Inventor:
Harry D. Lathrop
By Joshua R. H. Potts
his Attorney.

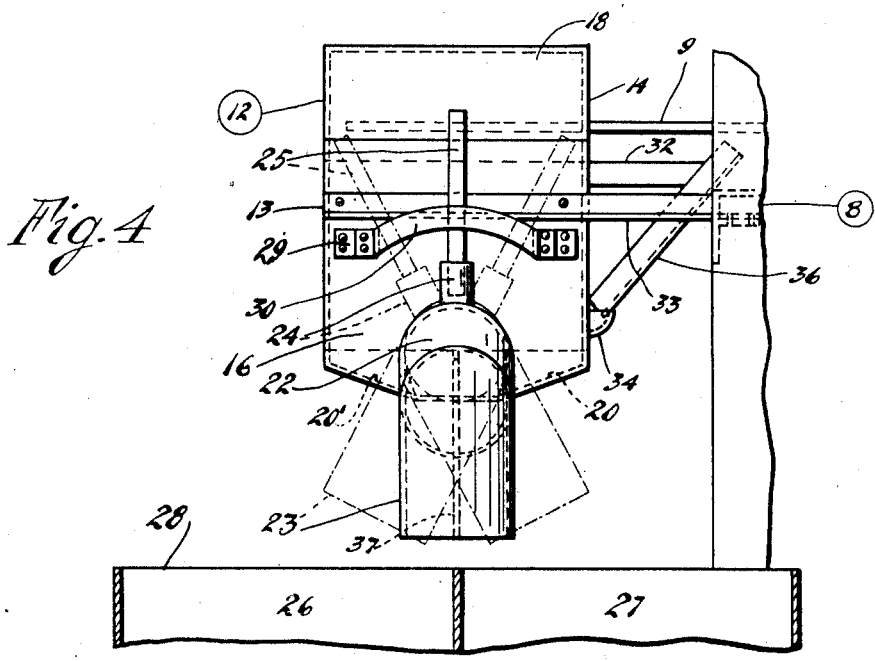
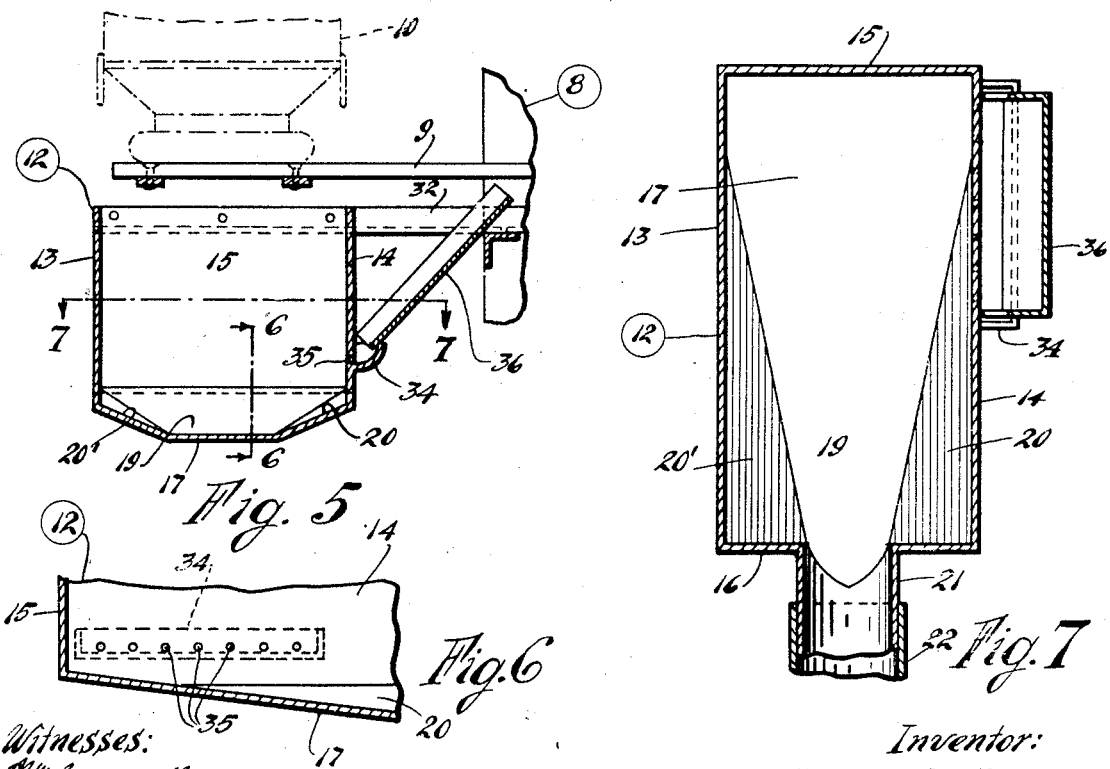

Patented Nov. 6, 1928.

1,690,735

UNITED STATES PATENT OFFICE.

HARRY D. LATHROP, OF CHICAGO, ILLINOIS.

MILK-DUMPING DEVICE.

Application filed October 13, 1924. Serial No. 743,315.

My present invention relates to a milk dumping device, more particularly to a device designed to facilitate the handling and weighing of the milk consignments from different consignors, and the main object of the invention is the provision of an improved device of this character which will be simple in construction, efficient in operation and economical in manufacture.

Another object of my invention is the provision of a device of this character, which will facilitate the handling and weighing of milk consignments, providing for a rapid and separate weighing of the product of each consignor, and which will reduce the number of laborers required for rapid handling operations.

Another object is the provision of a device of this character, which is especially adapted for use in connection with the milk can washing machines of the type illustrated in Letters Patent of the United States, No. 1,465,734, dated August 21, 1923.

Other objects will appear hereinafter.

The invention consists in the combinations and arrangements of parts hereinafter described and claimed.

The invention will be best understood by reference to the accompanying drawings forming a part of this specification, and in which, Fig. 1 is a top plan view of my improved device in connection with a fragment of a can washing machine, and also in connection with a fragment of a milk can delivery conveyor and further in connection with a fragment of a weigh tank;

Fig. 2 is a side elevation of my device in connection with a can washing machine and a weigh tank;

Fig. 3 is a cross section taken on the line 3—3 of Fig. 2;

Fig. 4 is a front elevation of my device, taken on the line 4—4 of Fig. 2;

Fig. 5 is an enlarged sectional view taken on the line 5—5 of Fig. 2;

Fig. 6 is an enlarged section taken on the line 6—6 of Fig. 5, illustrating in particular the apertures leading from the drain pocket into the hopper; and Fig. 7 is a longitudinal sectional view taken approximately on the line 7—7 of Fig. 5.

Referring now to the parts illustrated in the accompanying drawings, the numeral 8 designates as a whole a fragmentary portion of a milk can washing machine of the type illustrated in the Letters Patent above identified. This washing machine includes an upwardly projecting skeleton slideway 9 on which milk cans as 10 are inverted, when emptied, and moved into the washing machine in position to be seized by a conveyor (not shown) which conducts the cans through the machine for the various washing and cleansing operations to be performed thereon. The full milk cans are brought or conveyed to a point in proximity to the slideway as by means of a conveyor 11, herein fractionally shown.

The preferred embodiment of my dumping device as illustrated herein includes a milk containing body comprising a hopper, denoted generally by the numeral 12 and consisting of opposed sides 13 and 14, opposed ends 15 and 16 an inclined bottom 17 and a hood portion 18 which rises above the open top in the position opposite the lowest inclination of the bottom 17. The bottom of the hopper is not only inclined downwardly, but, as best illustrated in Figs. 5 and 7, it is formed with a central downwardly inclined drain 19 toward which the flanking sides 20 and 20' of the bottom incline, the said drain narrowing as it proceeds to the front end 16 of the hopper, where it discharges into a fixed outlet conduit pipe 21, through which the contents of the hopper is discharged.

Movably mounted upon the conduit pipe 21 is a delivery conduit pipe 22 which is formed with a down-turned discharging spout 23. As will be observed from an inspection of the drawings, both of these conduit pipes are inclined downwardly so that the flow of liquid therethrough may be accomplished by gravity. The delivery conduit pipe 22 is provided with an upwardly projecting bearing 24 receptive of the end of an operating lever 25, whereby the delivery conduit pipe 22 may be moved or swung into position to discharge into either of the compartments 26 or 27 of the weigh tank 28. Projecting forwardly from the front end 16 of the hopper are arms 29 which are connected by the parallel upwardly bowed cross members 30 in order to provide a slot 31 through which the lever 25 may be passed and in which it may be operated as in a guide for the suitable manual turning or swinging of the delivery conduit pipe 22.

As illustrated in the accompanying drawings, the hopper is mounted at the forward end of the can washing machine so that the skeleton slideway 9 will project over the rear portion thereof, with the hood 18 of the hopper rising a considerable distance above said slideway. In the present embodiment the hopper is shown as supported from the forward end of the washing machine by means of angle iron braces 32 and 33. Obviously, any other suitable means may be employed for supporting the hopper in the relative position desired. On the rear portion of the side 14 of the hopper, adjacent the washing machine, there is constructed an elongated drain pocket 34, within the compass of which the said side 14 is provided with apertures 35 through which the contents of the drain pocket will readily flow into the hopper. Supported upon this drain pocket so as to discharge thereinto is a drain trough 36 which extends into the washing machine underneath the slideway 9, so as to receive the milk drippings from the inverted cans and thereby prevent any waste of milk. In practice, the full milk cans are conveyed to the dumping device upon a conveyor as 11 from which they are moved onto the slideway 9 where the milk may be inspected. From this slideway the cans may be emptied into the hopper, the hood 18 thereof receiving the outflow from the cans. The cans in inverted positon are thence thrust into the washing machine upon the slideway. By means of the operating lever 25 the milk is diverted either into the compartment 26 or compartment 27 of the weigh tank. To prevent the milk from flowing from the discharging spout 23 in a swirl I provide within said spout a baffle plate 37. While the milk consignment discharged into the compartment 26 is being checked up and otherwise accounted for, a consignment from another consignor may be diverted into the compartment 27 of the weigh tank. In this manner a continuous handling of the consignments is provided for, and provision is made to give full credit to each of the consignors for the quantity of his consignment. In practice, the weigh tank 28 rests upon an automatic scale (not shown) from which the exact weight of the milk discharged into a compartment may be ascertained at a glance. It will also be understood, of course, that the weigh tank 28, for each of the compartments 26 and 27, is provided with a plug or valve controlled discharging outlet (not shown) through which the contents of the compartments may be discharged.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. The herein described milk dumping device including a hopper having downwardly and inwardly sloping bottom walls and a splash-preventing hood having an upwardly directed wall with a downward bend, a dumping platform above the hopper, a conduit leading outwardly from the hopper to weighing tanks disposed below the hopper, a spout swingably connected to the conduit whereby milk from the hopper may be directed into a particular weighing tank, means to drain spilled milk and means to receive said spilled milk, substantially as described.

2. The herein described milk dumping device including a hopper having downwardly and inwardly sloping bottom walls and a splash-preventing hood having an upwardly directed wall with a downward bend, a dumping platform above the hopper, a conduit leading outwardly from the hopper to weighing tanks disposed below the hopper, a spout swingably connected to the conduit whereby milk from the hopper may be directed into a particular weighing tank, and means in the spout for preventing the milk from swirling, means to drain spilled milk and means to receive said spilled milk, substantially as described.

3. The herein described milk dumping device including a hopper having downwardly and inwardly sloping bottom walls and a splash-preventing hood formed therewith, a dumping platform above the hopper, a conduit leading outwardly from the hopper, means to prevent milk from splashing out of the hopper, said conduit also leading to a spout swingably connected to the conduit for directing the flow of milk, means to drain spilled milk and means to receive said spilled milk, substantially as described, means in the spout for preventing the milk from swirling.

4. The herein described milk dumping device including a containing body comprising a hopper having sides and ends, an inclined bottom and a hood covering a portion of its top opposite the lowest inclination of the bottom, the hood curving upwardly and inwardly and then deflecting downwardly and inwardly to the top of the hopper, an inclined outlet conduit pipe into which the flow from the inclined bottom discharges, and a movable delivery conduit pipe combined with said outlet conduit pipe.

5. The herein described milk dumping device including a containing body comprising a hopper having a side wall, and a drain pocket formed in connection with said side wall exteriorly thereof, the top of said drain pocket being adapted to serve as a support for the end of a drain trough, said side wall within the compass of said pocket having apertures to provide for the draining of liquid from said pocket into said hopper.

6. The herein described milk dumping device including a milk receiving body comprising a hopper having a splash-preventing hood arranged to receive the outflow of milk cans, said hopper having a drain pocket formed to support a drain trough cooperating therewith, an outlet member protruding from the body, a milk diverting member swiveled on said protruding member, an open bearing on said diverting member, and an operating lever received in said bearing.

In testimony whereof I have signed my name to this specification.

HARRY D. LATHROP.